United States Patent
No et al.

(10) Patent No.: US 11,128,475 B2
(45) Date of Patent: Sep. 21, 2021

(54) ELECTRONIC DEVICE CAPABLE OF DATA COMMUNICATION THROUGH ELECTRONIC SIGNATURES BASED ON SYNDROME AND OPERATING METHOD THEREOF

(71) Applicants: Seoul National University R&DB Foundation, Seoul (KR); Industry-Academic Cooperation Foundation, Chosun University, Gwangju (KR)

(72) Inventors: Jong Seon No, Seoul (KR); Young Sik Kim, Gwangju (KR); Yong Woo Lee, Seoul (KR); Wi Jik Lee, Seoul (KR)

(73) Assignees: Seoul National University R&DB Foundation, Seoul (KR); Industry-Academic Cooperation Foundation, Chosun University, Gwangju (KR)

( * ) Notice: Subject to any disclaimer, the term of this patent is extended or adjusted under 35 U.S.C. 154(b) by 166 days.

(21) Appl. No.: 16/699,097

(22) Filed: Nov. 28, 2019

(65) Prior Publication Data

US 2020/0287722 A1    Sep. 10, 2020

(30) Foreign Application Priority Data

Mar. 8, 2019    (KR) .................. 10-2019-0027031

(51) Int. Cl.
H04L 29/06    (2006.01)
H04L 9/32    (2006.01)
H04L 9/06    (2006.01)

(52) U.S. Cl.
CPC .......... *H04L 9/3247* (2013.01); *H04L 9/0643* (2013.01)

(58) Field of Classification Search
CPC .......................... H04L 9/3247; H04L 9/0643
See application file for complete search history.

(56) References Cited

U.S. PATENT DOCUMENTS 5,134,616 A * 7/1992 Barth, Jr. ............... G11C 29/84
                                                    714/711
6,167,551 A * 12/2000 Nguyen ................. G11B 20/00
                                                    714/770

(Continued)

FOREIGN PATENT DOCUMENTS

KR    10-2018-0060588 A    6/2018

OTHER PUBLICATIONS

Wijik Lee et al., "RM Code-based signature scheme", Proceedings of Symposium of the Korean Institute of communications and Information Sciences, Jun. 2017, p. 1624-1625, Korea Institute Of Communication Sciences. 7 pages.

(Continued)

*Primary Examiner* — Ghodrat Jamshidi
(74) *Attorney, Agent, or Firm* — Park, Kim & Suh, LLC (57) ABSTRACT

Provided is an electronic signature technique depending on a diametrically different algorithm from the existing asymmetric key infrastructure electronic signature technique which generates predetermined syndrome data based on a message to be transmitted a data receiving device and then detects an error vector for an electronic signature from the syndrome data by using a parity check matrix and then generates an electronic signature value based on an error vector for the electronic signature and transmits the generated electronic signature value to the data receiving device.

13 Claims, 3 Drawing Sheets

(56) References Cited

U.S. PATENT DOCUMENTS

| | | | |
|---|---|---|---|
| 8,196,016 B1* | 6/2012 | Langner | H03M 13/1142 |
| | | | 714/758 |
| 10,193,574 B1* | 1/2019 | Teitel | H03M 13/159 |
| 2003/0126546 A1* | 7/2003 | Fujita | H03M 13/6561 |
| | | | 714/786 |
| 2008/0163032 A1* | 7/2008 | Lastras-Montano | |
| | | | H03M 13/159 |
| | | | 714/785 |
| 2014/0075272 A1* | 3/2014 | Kern | H03M 13/09 |
| | | | 714/785 |
| 2017/0302299 A1* | 10/2017 | Lin | G06F 11/1012 |
| 2018/0041229 A1* | 2/2018 | Yazdi | H03M 13/19 |
| 2018/0267733 A1* | 9/2018 | Xie | H03M 7/3091 |

OTHER PUBLICATIONS

J. van der Horst and T. Berger, "Complete Decoding of Triple-Error-Correcting Binary BCH Codes," IEEE Transactions on Information Theory, vol. 22, No. 2, pp. 138-147, Mar. 1976.
Y. S. Han, S.-W. Fu, and P.-N. Chen, "A New Step-By-Step Complete Decoding Algorithm for Binary Cyclic Codes," in Signals and Systems(ICSigSys), 2017 International Conference on, 2017, pp. 123-127: IEEE.

\* cited by examiner

ELECTRONIC DEVICE CAPABLE OF DATA COMMUNICATION THROUGH ELECTRONIC SIGNATURES BASED ON SYNDROME AND OPERATING METHOD THEREOF

CROSS-REFERENCE TO RELATED APPLICATIONS

This application claims priority to and the benefit of Korean Patent Application No. 10-2019-0027031 filed in the Korean Intellectual Property Office on Mar. 8, 2019, the entire contents of which are incorporated herein by reference.

TECHNICAL FIELD

The present invention relates to techniques that can be utilized in an asymmetric key based electronic signature system.

BACKGROUND ART

In recent years, introduction of a banking system or a payment system using online has been actively made as the Internet has been widely propagated.

The online banking service or payment system needs to accurately determine whether there is an account transfer or electronic payment request from a real person who wish to perform the account transfer or electronic payment.

For example, when user A performs account transfer to user B through the online banking service, a system providing the online banking service needs to check whether the corresponding account transfer request is really made by user A.

In general, as a user checking service that is introduced in a normal online banking service or payment system, an electronic signature system using a public key infrastructure (PKI) is primarily used.

The electronic signature system of the public key infrastructure is a system in which when a side of transferring a message generates an electronic signature value by performing encryption of a hash value for the corresponding message with a private key thereof and then transfers the corresponding message and the electronic signature value to a message receiving side, the message receiving side decodes the electronic signature value with a public key corresponding to the private key and when the hash value for the message received from a message transmitting side is computed and then a value decoded by the public key and the hash value for the message are compared with each other and it is determined that both values are equal to each other, it is verified that the message is a message transferred from a real message transmitting side as it is demonstrated that the electronic signature value received from the message transmitting side is a value really encrypted by the private key of the message transmitting side.

The electronic signature system of the public key infrastructure is operated in a form of generating the private key and the public key corresponding thereto by using a key exchange scheme depending on a Diffie-Hellman (DH) algorithm which is generally widely known and generating an electronic signature value with the private key and verifying the electronic signature value with the public key.

By considering that the existing electronic signature generating and verifying algorithm is already widely used in a related industry, a forgery possibility of electronic signatures is high, and as a result, the existing electronic signature generating and verifying algorithm has security vulnerability.

Accordingly, a research into a new scheme electronic signature generating verifying algorithm different from the existing electronic signature generating and verifying algorithm is required.

SUMMARY OF THE INVENTION

The present invention has been made in an effort to provide an electronic signature technique depending on a diametrically different algorithm from the existing asymmetric key infrastructure electronic signature technique which generates predetermined syndrome data based on a message to be transmitted to a data receiving device and then detects an error vector for an electronic signature from the syndrome data by using a parity check matrix and then generates an electronic signature value based on an error vector for the electronic signature and transmits the generated electronic signature value to the data receiving device.

An exemplary embodiment of the present invention provides an electronic device capable of data communication through electronic signatures based on syndrome, the electronic device including: a private key storing unit storing a parity check matrix H for a linear code having a size of (n−k)×n, in which n and k are natural numbers and n is larger than k, configured by a Reed-Muller (RM) code, an invertible matrix S having a size of (n−k)×(n−k) including code values of '1' and '0' as components, and a permutation matrix Q having a size of n×n including the code values of '1' and '0' as the components as a private key for the electronic signature; a syndrome data generating unit generating syndrome data $s_i$ to be used as the syndrome based on the plain text message m to be transmitted to a data receiving device and the invertible matrix S; an error vector generating unit generating a signature error vector $e_s^T$ by performing the syndrome decoding for error detection with respect to the syndrome data $s_i$ based on the parity check matrix H; an electronic signature unit computing $Q^{-1}e_s^T$ by multiplying a left term of the signature error vector $e_s^T$ by $Q^{-1}$ which is an inverse matrix of the permutation matrix Q to generate the computed $Q^{-1}e_s^T$ as the electronic signature value for the plain text message m; and an electronic signature transmitting unit transmitting the plain text message m and the electronic signature value $Q^{-1}e_s^T$ to the data receiving device.

Another exemplary embodiment of the present invention provides an operating method of an electronic device capable of data communication through electronic signatures based on the syndrome, the operating method including: maintaining a private key storing unit storing a parity check matrix H for a linear code having a size of (n−k)×n, in which n and k are natural numbers and n is larger than k, configured by a Reed-Muller (RM) code, an invertible matrix S having a size of (n−k)×(n−k) including code values of '1' and '0' as components, and a permutation matrix Q having a size of n×n including the code values of '1' and '0' as the components as a private key for the electronic signature; generating syndrome data $s_i$ to be used as the syndrome based on the plain text message m to be transmitted to a data receiving device and the invertible matrix S; generating a signature error vector $e_s^T$ by performing the syndrome decoding for error detection with respect to the syndrome data $s_i$ based on the parity check matrix H; computing $Q^{-1}e_s^T$ by multiplying a left term of the signature error vector $e_s^T$ by $Q^{-1}$ which is an inverse matrix of the permutation matrix Q to generate the computed $Q^{-1}e_s^T$ as the electronic signature value for the plain text message m; and transmitting the plain text message m and the electronic signature value $Q^{-1}e_s^T$ to the data receiving device.

The present invention can provide an electronic signature technique depending on a diametrically different algorithm from the existing asymmetric key infrastructure electronic signature technique which generates predetermined syndrome data based on a message to be transmitted to a data receiving device and then detects an error vector for an electronic signature from the syndrome data by using a parity check matrix and then generates an electronic signature value based on an error vector for the electronic signature and transmits the generated electronic signature value to the data receiving device.

DETAILED DESCRIPTION

Hereinafter, exemplary embodiments of the present invention will be described in detail with reference to the accompanying drawings. The description does not limit the present invention to specific exemplary embodiments, and it should be understood that the present invention covers all the modifications, equivalents and replacements included within the idea and technical scope of the present invention. In describing each drawing, like reference numerals refer to like elements and if it is not contrarily defined, all terms used herein including technological or scientific terms have the same meanings as those generally understood by a person with ordinary skill in the art.

In this document, unless explicitly described to the contrary, the word "comprise" and variations such as "comprises" or "comprising", will be understood to imply the inclusion of stated elements but not the exclusion of any other elements. Further, in various exemplary embodiments of the present invention, each of components, functional blocks or means may be constituted by one or more lower components and electrical, electronic, and mechanical functions performed by respective components may be implemented as various known devices or mechanical elements including an electronic circuit, an integrated circuit, an Application Specific Integrated Circuit (ASIC), etc., and the respective components may be separately implemented or two or more components may be integrated into one and implemented.

Meanwhile, blocks of the accompanying block diagram or steps of a flowchart may be appreciated as meaning compute program instructions mounted on a processor or a memory of data processible equipment such as a universal computer, a special computer, a portable notebook computer, a network computer, etc., and performing designated functions. Since the computer program instructions may be stored in a memory provided in a computer device or a computer readable memory, functions described in blocks of a block diagram or steps of a flowchart may be produced as a manufactured object including an instruction mean performing the functions. Moreover, each block or each step may represent a part of a module, a segment, or a code that includes one or more executable instructions for executing a specified logical function(s). It should also be noted that in some replaceable embodiments, the functions mentioned in the blocks or steps may also be executed differently from a predetermined order. For example, two blocks or steps that are subsequently illustrated are substantially simultaneously carried out, or may be performed in a reverse order, and in some cases, the functions may be performed while some blocks or steps are omitted.

Figure 1:
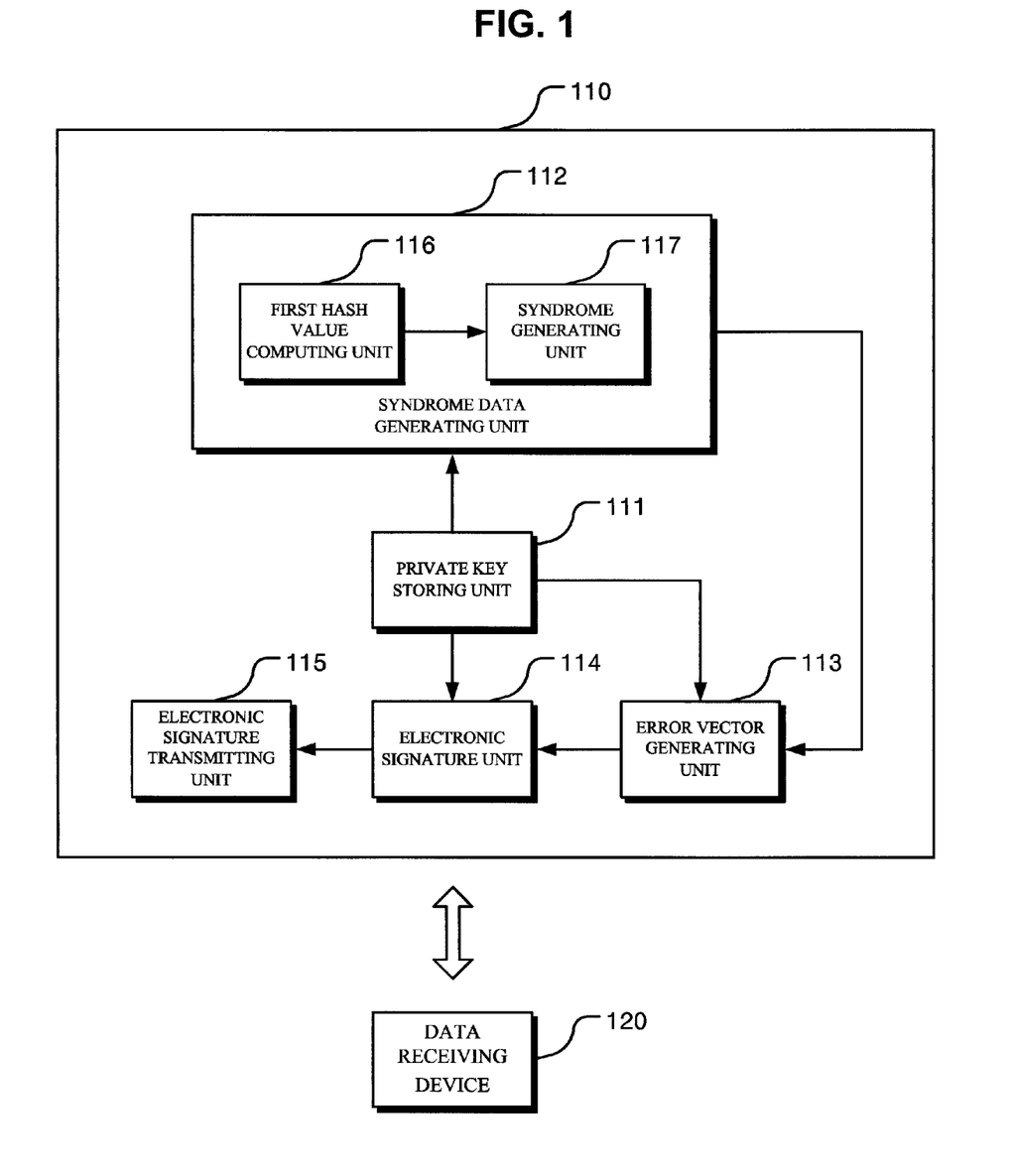
FIG. 1 is a diagram illustrating a structure of an electronic device capable of data communication through electronic signatures based on syndrome according to an exemplary embodiment of the present invention.

FIG. 1 is a diagram illustrating a structure of an electronic device capable of data communication through electronic signatures based on the syndrome according to an exemplary embodiment of the present invention.

Referring to FIG. 1, an electronic device 110 capable of data communication through electronic signatures based on syndrome according to the present invention includes a private key storing unit 111, a syndrome data generating unit 112, an error vector generating unit 113, an electronic signature unit 114, and an electronic signature transmitting unit 115.

The private key storing unit 111 stores a parity check matrix H for a linear code having a size of (n−k)×n configured by a Reed-Muller (RM) code, an invertible matrix S having a size of (n−k)×(n−k) including code values of '1' and '0' as components, and a permutation matrix Q having a size of n×n including the code values of '1' and '0' as the components as a private key for the electronic signature.

Here, n and k are natural numbers and n is a number larger than k.

The RM code is a linear code used as an error correction code. The RM code expressed by RM(r, m) has a length of 2m and m basic codes, and a code having a multiplication of the m basic codes also may be a basic code of RM. In addition, r represents the maximum number of basic codes that can be used in the multiplication of the basic codes. For example, when m=4 and r=4, the length of the RM code is 16. In this case, since the RM code is represented by $2^4$, RM code has four basic codes R1, R2, R3, and R4 (the length of each basic code is 16). In this case, the RM code which calculates the multiplication of the four basic codes R1, R2, R3, and R4 may also be the basic code. Here, the maximum number of codes usable for the multiplication of the four basic codes is four (r=4) in order to generate other additional basic codes for four basic codes R1, R2, R3, and R4, and as a result, a maximum of four mutual multiplications of four basic codes R1, R2, R3, and R4 are combined and calculated to generate additional basic codes. In this regard, with respect to RM(4, 4), four basic codes corresponding to R1, R2, R3, R4 and 11 basic codes consisting of R1R2, R1R3, R1R4, R2R3, R2R4, R3R4, R1R2R3, R1R2R4, R1R3R4, R2R3R4, and R1R2R3R4 may be generated and since the RM code needs to have even a code having bit values of which all are configured by '1' as the basic code due to characteristics of the RM code, a total of 16 basic codes can be consequently generated.

The RM code may be used for configuring a generation matrix for encoding a message to be transmitted to a data receiving side with a codeword and used for configuring the parity check matrix for verifying whether an error occurs in the codeword received by the data receiving side.

The parity check matrix is a matrix for verifying whether the error occurs in the codeword received by the data receiving side and when there is a generation matrix G having a size of k×n, if the parity check matrix corresponding to the generation matrix G is 'H', a size of the parity check matrix H becomes (n−k)×n and there is a characteristic shown in Equation 1 below between the parity check matrix H and the generation matrix G.

$$GH^T = 0 \quad \text{[Equation 1]}$$

Here, $H^T$ means a transposed matrix of the parity check matrix H.

As a data transmitting side generates a codeword c by using the generation matrix G and transmits the generated codeword c to the data receiving side, data received by the data receiving side is referred to as 'r' and when the error does not occur in the data r, there is a characteristic shown in Equation 2 below in a relationship with the parity check matrix H with respect to the data r.

$$Hr^T = Hr^T = 0 \quad \text{[Equation 2]}$$

Here, $r^T$ means the transposed matrix of the data r.

However, when the error e occurs in the codeword c transmitted by the data transmitting side, the data r received by the data receiving side will become 'c⊕e', and as a result, there is a characteristic shown in Equation 3 below between the parity check matrix H and the data r.

$$\begin{aligned} Hr^T &= H(c \oplus e)^T \\ &= Hc^T \oplus He^T \\ &= He^T \text{ (since } Hc^T = 0\text{)} \\ &= s \end{aligned} \quad \text{[Equation 3]}$$

Here, ⊕ means an exclusive OR operation.

Like the operation in Equation 3, the data receiving side may detect whether the error is present in the data received by the data receiving side by using the parity check matrix. In this case, 's' is referred to as syndrome in Equation 3 and the data receiving side computes the syndrome based on the parity check matrix H and then performs syndrome decoding for finding e satisfying $Hr^T = s$ to find the error e included in the received data r.

In general, in general syndrome decoding, when an error correction capability of the parity check matrix is limited to t, an error code e satisfying $Hr^T = s$ may be found only when a data error occurs with respect to bits of t or less.

However, when the parity check matrix H is configured by the RM code, if a complete decoding algorithm which is one of syndrome decoding schemes is used with respect to the syndrome s expressed in Equation 3, the error e satisfying $Hr^T = s$ may be found even through errors of a number larger than t occur in received data.

The complete decoding algorithm is a decoding algorithm of finding e having a minimum Hamming weight among es satisfying $Hr^T = s$ when there are a parity check matrix having a size of r×n and syndrome s∈0.1$^r$. When the complete decoding algorithm is used, an error which exceeds the error correction capability of the generation matrix may also be decoded and recursive decoding which is one of decoding methods of the RM code is characterized in that complete decoding is possible.

Here, the Hamming weight means the number of code values, which is '1' in a set of code values constituted by '0' and '1'.

The complete decoding algorithm is disclosed in "J. van der Horst and T. Berger, "Complete Decoding of Triple-Error-Correcting Binary BCH Codes," IEEE Transactions on Information Theory, vol. 22, no. 2, pp. 138-147, 1976." Y. S. Han, S.-W. Fu, and P.-N. Chen, "A New Step-By-Step Complete Decoding Algorithm for Binary Cyclic Codes," in "Signals and Systems (ICSigSys), 2017 International Conference on, 2017, pp. 123-127: IEEE." which is a prior art document.

In this case, according to an exemplary embodiment of the present invention, the parity check matrix H stored in the private key storing unit 111 may be a parity check matrix corresponding to $G_m$ which is a generation matrix made by randomly permuting components which are present in p (p is a natural number) rows included in at least one partial matrix among a plurality of partial matrixes configured by another RM code configured when n columns constituting the generation matrix G are distinguished for each of n/4 in the generation matrix G having the size of k×n configured by the RM code.

Figure 2:
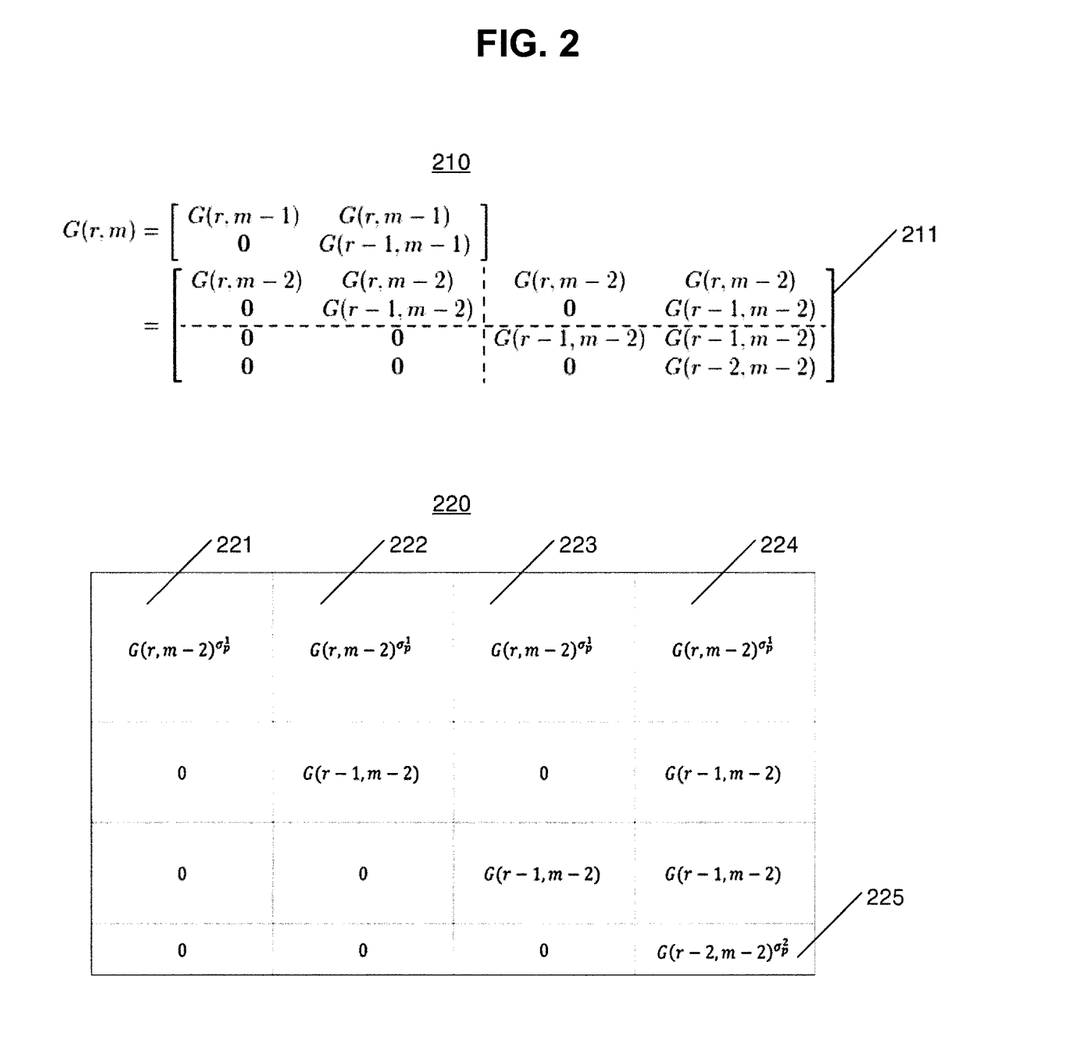
FIG. 2 is a diagram for describing an electronic device capable of data communication through electronic signatures based on syndrome according to an exemplary embodiment of the present invention.

In this regard, when the generation matrix of the RM code is G(r,m), the generation matrix G(r,m) may have a recursive structure as shown in reference numeral 210 of FIG. 2 and like a matrix having a structure shown in reference numeral 211, the generation matrix G(r,m) may be expressed by partial matrixes configured by another RM code, such as G(r, m-2), G(r-1, m-2), and G(r-2, m-2) and partial matrixes configured by 0.

In this case, as the parity check matrix H used in the present invention, a parity check matrix may be used, which corresponds to the generation matrix $G_m$ made by randomly permuting the components which are present in p rows included in at least one partial matrix 221, 222, 223, 224, or 225 among the plurality of partial matrixes configured by another RM code configured when n columns constituting the generation matrix G are distinguished for each of n/4 as shown in reference numeral 220. That is, as the parity check matrix H, a parity check matrix satisfying Equation 4 below may be used.

$$G_m H^T = 0 \quad \text{[Equation 4]}$$

When the generation matrix $G_m$ is described in more detail, the generation matrix $G_m$ may be generated by randomly selecting p rows included in partial matrix 1 221, partial matrix 2 222, partial matrix 3 223, partial matrix 4 224, and partial matrix 5 225 among the plurality of partial matrixes configured by another RM code, such as G(r, m-2), G(r-1, m-2), and G(r-2, m-2) configured when n columns constituting the generation matrix G of an original RM code are distinguished for each of n/4 and randomly permuting the components which are present in p rows selected in each partial matrix 221, 222, 223, 224, or 225 as shown in reference numeral 220.

The complete decoding algorithm which may be used in the RM code has a characteristic that even though a partial code which belongs to a recursive process in the generation matrix is modified to another code which is completely decoded, an error code may still be found according to the complete decoding algorithm and since the permuted RM code is a code which is completely decoded, the complete decoding algorithm may be used even in the generation matrix $G_m$ in which a part of the generation matrix G having the recursive structure is replaced with a partially permuted RM code.

Accordingly, as the parity check matrix H according to the present invention, a matrix may be used, which corresponds to the generation matrix G using the normal RM code, but a matrix generated based on the generation matrix $G_m$ modified by permuting some codes in the generation matrix G may be used in order to increase randomness for preventing a pattern attack during an electronic signature process.

As such, if a plain text message to be transmitted to the data receiving device 120 is m while the parity check matrix H, the invertible matrix S, and the permutation matrix Q are stored in the private key storing unit 111 with the private key, the syndrome data generating unit 112 generates syndrome data $s_i$ to be used as the syndrome based on the plain text message m and the invertible matrix S.

The error vector generating unit 113 generates a signature error vector $e_s^T$ by performing the syndrome decoding for error detection with respect to the syndrome data $s_i$ based on the parity check matrix H.

The electronic signature unit 114 computes $Q^{-1}e_s^T$ by multiplying a left term of the signature error vector $e_s^T$ by $Q^{-1}$ which is an inverse matrix of the permutation matrix Q to generate the computed $Q^{-1}e_s^T$ as the electronic signature value for the plain text message m.

The electronic signature transmitting unit 115 transmits the plain text message m and the electronic signature value $Q^{-1}e_s^T$ to the data receiving device 120.

In this case, according to an exemplary embodiment of the present invention, the syndrome data generating unit 112 may include a first hash value computing unit 116 and a syndrome generating unit 117.

The first hash value computing unit 116 applies the plain text message m to h(x) which is a predetermined hash function as an input to compute a first hash value h(m).

Here, the hash function h(x) is a unidirectional function to convert an input value into an output value having an (n−k) bit size.

The syndrome generating unit 117 generates the syndrome data $s_i$ by computing h(h(m)|i) which is the second hash value by applying a result value h(m)|i acquired by concatenating a bit value for a variable i to the first hash value h(m) while randomly selecting the variable i (the variable i is an integer which is equal to or more than '0') to the hash function h(x) as the input and multiplying the left term of $h(h(m)|i)^T$ which is the transposed matrix of the h(h(m)|i) which is the second hash value by $S^{-1}$ which is the inverse matrix of the invertible matrix S, when computing the first hash value h(m) is completed.

As a result, the syndrome data $s_i$ may be expressed as shown in Equation 5 below.

$$s_i = S^{-1}h(h(m)|i)^T \qquad \text{[Equation 5]}$$

In this case, according to an exemplary embodiment of the present invention, the error vector generating unit 113 may compute $e^T$ satisfying $He^T=s_i$ ($e^T$ as the transposed matrix of vector e having a size of n has a size of n×1) by performing complete decoding for the error detection based on the parity check matrix H with respect to the syndrome data $s_i$ of each variable i whenever while the variable i is randomly selected, the syndrome data s is generated and then select the variable i at the time when the Hamming weight of $e^T$ is computed to be equal to or less than w which is the selected Hamming weight as a signature variable $i_s$ and simultaneously select $e^T$ computed to correspond to the signature variable $i_s$ as the signature error vector $e_s^T$.

That is, the error vector generating unit 113 may compute $e^T$ satisfying $He^T=s_i$ by performing the complete decoding based on the parity check matrix H while randomly selecting the variable i with respect to $s_i$ shown in Equation 5 and stop a computation of finding $e^T$ at the time when the Hamming weight of $e^T$ is computed to be equal to or less than w which is the selected Hamming weight and select $e^T$ computed to correspond to the signature variable $i_s$ as the signature error vector $e_s^T$ while selecting the variable i at the corresponding time as the signature variable $i_s$.

Thereafter, the electronic signature unit 114 computes $Q^{-1}e_s^T$ by multiplying the left term of the signature error vector $e_s^T$ by $Q^{-1}$ which is the inverse matrix of the permutation matrix Q to generate the computed $Q^{-1}e_s^T$ as the electronic signature value for the plain text message m.

The electronic signature transmitting unit 115 may transmit the plain text message m, the electronic signature value $Q^{-1}e_s^T$, and the signature variable $i_s$ to the data receiving device 120.

In this case, according to an exemplary embodiment of the present invention, the data receiving device 120 may store, in the memory, $K_{pub}$ having a size of (n−k)×n, which is a matrix multiplied by the invertible matrix S, the parity check matrix H, and the permutation matrix Q as a public key for verifying the electronic signature.

Here, the public key $K_{pub}$ may be expressed as shown in Equation 6 below.

$$K_{pub}=SHQ \qquad \text{[Equation 6]}$$

When the data receiving device 120 receives the plain text message m, and the electronic signature value $Q^{-1}e_s^T$ and the signature variable $i_s$, the data receiving device 120 checks whether the Hamming weight of the electronic signature value $Q^{-1}e_s^T$ is equal to or less than w which is the selected Hamming weight and then when it is verified that the Hamming weight of the electronic signature value $Q^{-1}e_s^T$ is equal to or less than w which is the predetermined Hamming weight, the data receiving device 120 may verify the electronic signature value $Q^{-1}e_s^T$ based on the public key $K_{pub}$ and the signature variable $i_s$, in order to verify whether the electronic signature value $Q^{-1}e_s^T$ is data transmitted by the real data transmitting side.

In this regard, the data receiving device 120 as a specific component for verifying the electronic signature value $Q^{-1}e_s^T$ stores the hash function h(x) in the memory and when the plain text message m, and the electronic signature value $Q^{-1}e_s^T$ and the signature variable $i_s$ are received, the data receiving device 120 may verify whether the Hamming weight of the electronic signature value $Q^{-1}e_s^T$ is equal to or less than w which is the predetermined Hamming weight.

As described above, since the error vector generating unit 113 of the electronic device 110 selects the signature error vector $e_s^T$ in which the Hamming weight is equal to or less than w which is the predetermined Hamming weight and generates the electronic signature value $Q^{-1}e_s^T$ and transmits the generated electronic signature value to the data receiving device 120, only when the Hamming weight of the electronic signature value $Q^{-1}e_s^T$ received by the data receiving device 120 is equal to or less than w which is the predetermined Hamming weight, it can be regarded that the data receiving device 120 normally receives data.

Accordingly, when the data receiving device 120 receives the plain text message m, and the electronic signature value $Q^{-1}e_s^T$ and the signature variable $i_s$, the data receiving device 120 first verifies whether the Hamming weight of the electronic signature value $Q^{-1}e_s^T$ is equal to or less than w which is the predetermined Hamming weight.

When it is verified that the Hamming weight of the electronic signature value $Q^{-1}e_s^T$ is equal to or less than w which is the predetermined Hamming weight, the data receiving device 120 may compute the first hash value h(m) by applying the plain text message m to the hash function h(x) stored in the memory as the input.

Then, the data receiving device 120 may compute $h(h(m)|i_s)$ which is a) verification hash value by applying a result value $h(m)|i_s$ acquired by concatenating the bit value for the signature variable $i_s$ to the first hash value h(m) to the hash function h(x) as the input.

Thereafter, the data receiving device 120 compares whether $K_{pub}Q^{-1}e_s^T$ which is a result value acquired by multiplying the public key $K_{pub}$ by the electronic signature value $Q^{-1}e_s^T$ coincides with $h(h(m)|i_s)^T$ which is the transposed matrix of the verification hash value $h(h(m)|i_s)$ and when it is determined that the $K_{pub}Q^{-1}e_s^T$ coincides with $h(h(m)|i_s)^T$ which is the transposed matrix of the verification hash value $h(h(m)|i_s)$, the data receiving device 120 may determine that verifying the electronic signature value $Q^{-1}e_s^T$ is successful.

In this regard, $K_{pub}Q^{-1}e_s^T$ which is the result value acquired by multiplying the public key $K_{pub}$ by the electronic signature value $Q^{-1}e_s^T$ may be expressed as shown in Equation 7 below.

$$K_{pub}Q^{-1}e_s^T = SHQQ^{-1}e_s^T \qquad \text{[Equation 7]}$$
$$= SHe_s^T$$

$h(h(m)|i_s)^T$ which is the transposed matrix of the verification hash value $h(h(m)|i_s)$ may be expressed as shown in Equation 8 below.

$$h(h(m)|i_s)^T = SS^{-1}h(h(m)|i_s)^T \qquad \text{[Equation 8]}$$

In Equation 8, if the signature variable $i_s$ is normally received from the electronic device 110 to the data receiving device 120 without forgery or falsification, since $S^{-1}h(h(m)|i_s)^T$ is the syndrome (see Equation 5) generated through the syndrome generating unit 117 of the electronic device 110, $S^{-1}h(h(m)|i_s)^T$ will become the same value as $He_s^T$.

As a result, if the electronic signature value $Q^{-1}e_s^T$ is normally received from the electronic device 110 to the data receiving device 120 without the forgery or falsification, $K_{pub}Q^{-1}e_s^T$ depending on Equation 7 and $h(h(m)|i_s)^T$ depending on Equation 8 should be the same value as shown in Equation 9 below.

$$K_{pub}Q^{-1}e_s^T = SHQQ^{-1}e_s^T \qquad \text{[Equation 9]}$$
$$= SHe_s^T$$
$$= SS^{-1}h(h(m)|i_s)^T$$
$$= (\text{since } He_s^T = S^{-1}h(h(m)|i_s)^T)$$
$$= h(h(m)|i_s)^T$$

Accordingly, when the data receiving device 120 determines that the $K_{pub}Q^{-1}e_s^T$ coincides with $(h(h(m)|i_s)^T$ which is the transposed matrix of the verification hash value $h(h(m)|i_s)$, the data receiving device 120 may determine that verifying the electronic signature value $Q^{-1}e_s^T$ is successful.

Figure 3:
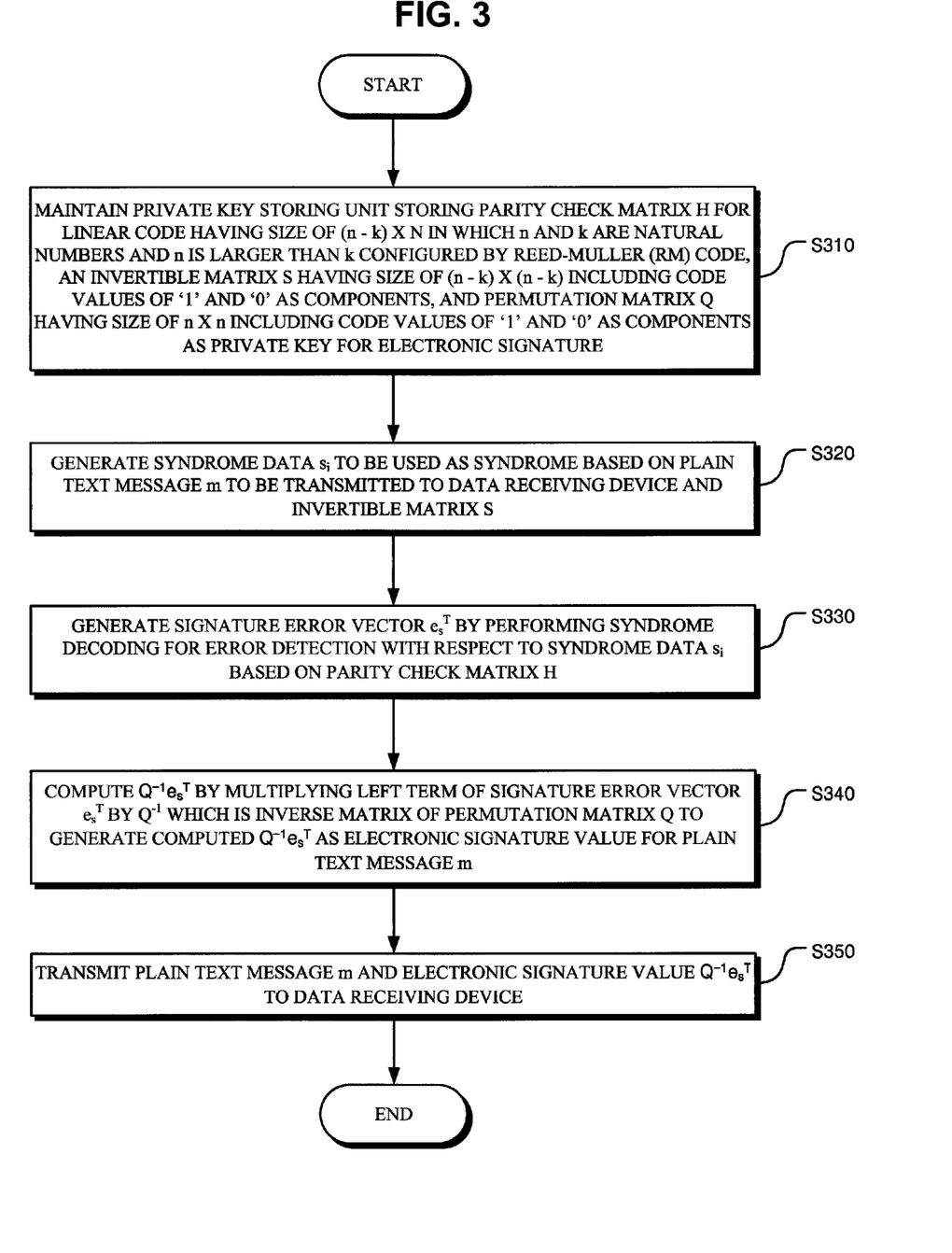
FIG. 3 is a flowchart showing an operating method of an electronic device capable of data communication through electronic signatures based on syndrome according to an exemplary embodiment of the present invention.

FIG. 3 is a flowchart showing an operating method of an electronic device capable of data communication through electronic signatures based on syndrome according to an exemplary embodiment of the present invention.

In step S310, the private key storing unit is maintained, which stores a parity check matrix H for a linear code having a size of (n−k)×n configured by the RM code, an invertible matrix S having a size of (n−k)×(n−k) including code values of '1' and '0' as components, and a permutation matrix Q having a size of n×n including the code values of '1' and '0' as the components as a private key for the electronic signature.

Here, n and k are natural numbers and n is a number larger than k.

In step S320, the syndrome data $s_i$ to be used as the syndrome is generated based on the plain text message m to be transmitted to the data receiving device and the invertible matrix S.

In step S330, the signature error vector $e_s^T$ is generated by performing the syndrome decoding for error detection with respect to the syndrome data $s_i$ based on the parity check matrix H.

In step S340, $Q^{-1}e_s^T$ is computed by multiplying a left term of the signature error vector $e_s^T$ by $Q^{-1}$ which is an inverse matrix of the permutation matrix Q to generate the computed $Q^{-1}e_s^T$ as the electronic signature value for the plain text message m.

In step S350, the plain text message m and the electronic signature value $Q^{-1}e_s^T$ are transmitted to the data receiving device.

In this case, according to an exemplary embodiment of the present invention, the parity check matrix H may be a parity check matrix corresponding to $G_m$ which is a generation matrix made by randomly permuting components which are present in p (p is a natural number) rows included in at least one partial matrix among a plurality of partial matrixes configured by another RM code configured when n columns constituting the generation matrix G are distinguished for each of n/4 in the generation matrix G having the size of k×n configured by the RM code.

According to an exemplary embodiment of the present invention, step S320 may include a step of computing a first hash value h(m) by applying the plain text message m to a predetermined hash function h(x) (the hash function h(x) is a unidirectional function to convert an input value into an output value having a size of (n−k) bits) as the input, and a step of computing a second hash value h(h(m)|i) by applying a result value h(m)|i acquired by concatenating the bit value for the variable i to the first hash value h(m) to the hash function h(x) as the input while randomly selecting the variable i (the variable i is an integer which is equal to or more than '0') when computing the first hash value h(m) is completed and generating the syndrome data $s_i$ ($s_i = S^{-1}h(h(m)|i)^T$) by multiplying the left term of the transposed matrix $h(h(m)|i)^T$ of the second hash value h(h(m)|i) by the inverse matrix $S^{-1}$ of the invertible matrix S.

In this case, according to an exemplary embodiment of the present invention, in step S330, $e^T$ satisfying $He^T = s_i$ ($e^T$ as the transposed matrix of vector e having a size of n has a size of n×1) may be computed by performing complete decoding for the error detection based on the parity check matrix H with respect to the syndrome data $s_i$ of each variable i whenever while the variable i is randomly selected, the syndrome data $s_i$ is generated and then the variable i may be selected at the time when the Hamming weight of $e^T$ is computed to be equal to or less than w which is the predetermined Hamming weight as a signature variable $i_s$ and $e^T$ computed to correspond to the signature variable $i_s$ may be selected as the signature error vector $e_s^T$.

In this case, in step S350, the plain text message m, and the electronic signature value $Q^{-1}e_s^T$ and the signature variable $i_s$ may be transmitted to the data receiving device.

In this case, according to an exemplary embodiment of the present invention, the data receiving device may store, in the memory, $K_{pub}$ ($K_{pub}$=SHQ) having a size of (n−k)×n, which is a matrix multiplied by the invertible matrix S, the parity check matrix H, and the permutation matrix Q as a public key for verifying the electronic signature, and when the data receiving device receives the plain text message m, and the electronic signature value $Q^{-1}e_s^T$ and the signature variable $i_s$, the data receiving device checks whether the Hamming weight of the electronic signature value $Q^{-1}e_s^T$ is equal to or less than w which is the predetermined Hamming weight and then when it is verified that the Hamming weight of the electronic signature value $Q^{-1}e_s^T$ is equal to or less than w which is the predetermined Hamming weight, the data receiving device may verify the electronic signature value $Q^{-1}e_s^T$ based on the public key $K_{pub}$ and the signature variable $i_s$.

In this case, according to an exemplary embodiment of the present invention, the data receiving device may additionally store the hash function h(x) in the memory and when the plain text message m, and the electronic signature value $Q^{-1}e_s^T$ and the signature variable $i_s$ are received, the data receiving device may verify whether the Hamming weight of the electronic signature value $Q^{-1}e_s^T$ is equal to or less than w which is the predetermined Hamming weight and then when it is verified that the Hamming weight of the electronic signature value $Q^{-1}e_s^T$ is equal to or less than w which is the predetermined Hamming weight, the data receiving device may compute the first hash value h(m) by applying the plain text message m to the hash function h(x) stored in the memory as the input, when the first hash value h(m) is computed, the data receiving device may compute $h(h(m)|i_s)$ which is a verification hash value by applying a result value $h(m)|i_s$ acquired by concatenating the bit value for the signature variable $i_s$ to the first hash value h(m) to the hash function h(x) as the input, and the data receiving device compares whether $K_{pub}Q^{-1}e_s^T$ which is a result value acquired by multiplying the public key $K_{pub}$ by the electronic signature value $Q^{-1}e_s^T$ coincides with $h(h(m)|i_s)^T$ which is the transposed matrix of the verification hash value $h(h(m)|i_s)$ and when it is determined that the $K_{pub}Q^{-1}e_s^T$ coincides with $h(h(m)|i_s)^T$ which is the transposed matrix of the verification hash value $h(h(m)|i_s)$, the data receiving device may determine that verifying the electronic signature value $Q^{-1}e_s^T$ is successful.

Hereinabove, an operating method of an electronic device capable of data communication through electronic signatures based on syndrome according to an exemplary embodiment of the present invention is described with reference to FIG. 3. Herein, since the operating method of the electronic device capable of data communication through electronic signatures based on syndrome according to an exemplary embodiment of the present invention may correspond to the configuration for the operation of the electronic device 110 capable of data communication through electronic signatures based on syndrome, which is described by using FIGS. 1 and 2, a more detailed description thereof will be omitted.

The operating method of the electronic device capable of data communication through electronic signatures based on syndrome according to an exemplary embodiment of the present invention may be implemented by a computer program stored in a storage medium for executing the computer program through coupling with a computer.

The operating method of the electronic device capable of data communication through electronic signatures based on syndrome according to an exemplary embodiment of the present invention may be implemented in a program command type which may be performed through various computer means and recorded in a computer readable medium. The computer readable medium may singly or combinationally include a program command, a data file, or a data structure or a combination thereof. The program command recorded in the medium may be program instructions specially designed and configured for the present invention, or may be program instructions publicly known to and used by those skilled in the computer software field. Examples of the computer-readable recording medium include magnetic media such as a hard disk, a floppy disk, and a magnetic tape, optical media such as a CD-ROM and a DVD, magneto-optical media such as a floptical disk, and a hardware device which is specifically configured to store and execute the program command such as a ROM, a RAM, and a flash memory. Examples of the program command include a high-level language code executable by a computer by using an interpreter, and the like, as well as a machine language code created by a compiler.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

Accordingly, the spirit of the present invention should not be defined only by the described exemplary embodiments, and it should be appreciated that claims to be described below and all things which are equivalent to the claims or equivalently modified to the claims are included in the scope of the spirit of the present invention.

What is claimed is:

1. An electronic device capable of data communication through electronic signatures based on syndrome, the electronic device comprising:
   One or more hardware processor and memory;
   a private key storing unit storing a parity check matrix H for a linear code having a size of (n−k)×n, in which n and k are natural numbers and n is larger than k, configured by a Reed-Muller (RM) code, an invertible matrix S having a size of (n−k)×(n−k) including code values of '1' and '0' as components, and a permutation matrix Q having a size of n×n including the code values of '1' and '0' as the components as a private key for the electronic signature;
   a syndrome data generating software unit generating syndrome data $s_i$ to be used as the syndrome based on the plain text message m to be transmitted to a data receiving device and the invertible matrix S;
   an error vector generating unit generating a signature error vector $e_s^T$ by performing the syndrome decoding for error detection with respect to the syndrome data $s_i$ based on the parity check matrix H;
   an electronic signature unit computing $Q^{-1}e_s^T$ by multiplying a left term of the signature error vector $e_s^T$ by $Q^{-1}$ which is an inverse matrix of the permutation matrix Q to generate the computed $Q^{-1}e_s^T$ as the electronic signature value for the plain text message m; and an electronic signature transmitting unit transmitting the plain text message m and the electronic signature value $Q^{-1}e_s^T$ to the data receiving device.

2. The electronic device of claim 1, wherein the parity check matrix H is a parity check matrix corresponding to $G_m$ which is a generation matrix made by randomly permuting components which are present in p (p is a natural number) rows included in at least one partial matrix among a plurality of partial matrixes configured by another RM code configured when n columns constituting the generation matrix G are distinguished for each of n/4 in the generation matrix G having the size of k×n configured by the RM code.

3. The electronic device of claim 1, wherein the syndrome data generating unit includes:
   a first hash value computing unit computing a first hash value h(m) by applying the plain text message m to a predetermined hash function h(x) as an input, in which the hash function h(x) is a unidirectional function to convert an input value into an output value having an (n−k) bit size; and
   a syndrome generating unit generating the syndrome data $s_i$ in which $s_i = S^{-1}h(h(m)|i)^T$ by computing h(h(m)|i) which is a second hash value by applying a result value h(m)|i acquired by concatenating a bit value for a variable i to the first hash value h(m) while randomly selecting the variable i in which the variable i is an integer which is equal to or more than '0' to the hash function h(x) as the input and multiplying the left term of $h(h(m)|i)^T$ which is the transposed matrix of the h(h(m)|i) which is the second hash value by $S^{-1}$ which is the inverse matrix of the invertible matrix S, when computing the first hash value h(m) is completed.

4. The electronic device of claim 3, wherein the error vector generating unit computes $e^T$ satisfying $He^T = s_i$ in which $e^T$ as the transposed matrix of vector e having a size of n has a size of n×1 by performing complete decoding for the error detection based on the parity check matrix H with respect to the syndrome data $s_i$ of each variable i whenever while the variable i is randomly selected, the syndrome data $s_i$ is generated and then selects the variable i at the time when the Hamming weight of $e^T$ is computed to be equal to or less w which is the predetermined Hamming weight as a signature variable $i_s$ and selects $e^T$ computed to correspond to the signature variable $i_s$ as the signature error vector $e_s^T$, and
   the electronic signature transmitting unit transmits the plain text message m, and the electronic signature value $Q^{-1}e_s^T$ and the signature variable $i_s$ to the data receiving device.

5. The electronic device of claim 4, wherein the data receiving device stores, in the memory, $K_{pub}$, in which $K_{pub} = SHQ$, having a size of (n−k)×n, which is a matrix multiplied by the invertible matrix S, the parity check matrix H, and the permutation matrix Q as a public key for verifying the electronic signature, and when the data receiving device receives the plain text message m, and the electronic signature value $Q^{-1}e_s^T$ and the signature variable $i_s$, the data receiving device checks whether the Hamming weight of the electronic signature value $Q^{-1}e_s^T$ is equal to or less than w which is the predetermined Hamming weight and then when it is verified that the Hamming weight of the electronic signature value $Q^{-1}e_s^T$ is equal to or less than w which is the predetermined Hamming weight, the data receiving device verifies the electronic signature value $Q^{-1}e_s^T$ based on the public key $K_{pub}$ and the signature variable $i_s$.

6. The electronic device of claim 5, wherein the data receiving device
   additionally stores the hash function h(x) in the memory and when the plain text message m, and the electronic signature value $Q^{-1}e_s^T$ and the signature variable $i_s$ are received, verifies whether the Hamming weight of the electronic signature value $Q^{-1}e_s^T$ is equal to or less than w which is the predetermined Hamming weight and then when it is verified that the Hamming weight of the electronic signature value $Q^{-1}e_s^T$ is equal to or less than w which is the predetermined Hamming weight, computes the first hash value h(m) by applying the plain text message m to the hash function h(x) stored in the memory as the input,
   when the first hash value h(m) is computed, computes $h(h(m)|i_s)$ which is a verification hash value by applying a result value $h(m)|i_s$ acquired by concatenating the bit value for the signature variable $i_s$ to the first hash value h(m) to the hash function h(x) as the input, and compares whether $K_{pub}Q^{-1}e_s^T$ which is a result value acquired by multiplying the public key $K_{pub}$ by the electronic signature value $Q^{-1}e_s^T$ coincides with $h(h(m)|i_s)^T$ which is the transposed matrix of the verification hash value $h(h(m)|i_s)$ and when it is determined that the $K_{pub}Q^{-1}e_s^T$ coincides with $h(h(m)|i_s)^T$ which is the transposed matrix of the verification hash value $h(h(m)|i_s)$, determines that verifying the electronic signature value $Q^{-1}e_s^T$ is successful.

7. An operating method of an electronic device capable of data communication through electronic signatures based on syndrome, the operating method comprising:
   maintaining a private key storing unit storing a parity check matrix H for a linear code having a size of (n−k)×n, in which n and k are natural numbers and n is larger than k, configured by a Reed-Muller (RM) code, an invertible matrix S having a size of (n−k)×(n−k) including code values of '1' and '0' as components, and a permutation matrix Q having a size of n×n including the code values of '1' and '0' as the components as a private key for the electronic signature;
   generating syndrome data $s_i$ to be used as the syndrome based on the plain text message m to be transmitted to a data receiving device and the invertible matrix S;
   generating a signature error vector $e_s^T$ by performing the syndrome decoding for error detection with respect to the syndrome data $s_i$ based on the parity check matrix H;
   computing $Q^{-1}e_s^T$ by multiplying a left term of the signature error vector $e_s^T$ by $Q^{-1}$ which is an inverse matrix of the permutation matrix Q to generate the computed $Q^{-1}e_s^T$ as the electronic signature value for the plain text message m; and
   transmitting the plain text message m and the electronic signature value $Q^{-1}e_s^T$ to the data receiving device.

8. The operating method of claim 7, wherein the parity check matrix H is a parity check matrix corresponding to $G_m$ which is a generation matrix made by randomly permuting components which are present in p (p is a natural number) rows included in at least one partial matrix among a plurality of partial matrixes configured by another RM code configured when n columns constituting the generation matrix G are distinguished for each of n/4 in the generation matrix G having the size of k×n configured by the RM code.

9. The operating method of claim 7, wherein the generating of the syndrome data $s_i$ includes:
   computing a first hash value h(m) by applying the plain text message m to a predetermined hash function h(x)

as an input, in which the hash function h(x) is a unidirectional function to convert an input value into an output value having an (n−k) bit size; and generating the syndrome data $s_i$ in which $s_i = S^{-1}h(h(m)|i)^T$ by computing the second hash value h(h(m)|i) by applying a result value h(m)|i acquired by concatenating a bit value for a variable i to the first hash value h(m) while randomly selecting the variable i (i the variable i is an integer which is equal to or more than '0') to the hash function h(x) as the input and multiplying the left term of $h(h(m)|i)^T$ which is the transposed matrix of the h(h(m)|i) which is the second hash value by $S^{-1}$ which is the inverse matrix of the invertible matrix S, when computing the first hash value h(m) is completed.

10. The operating method of claim 9, wherein in the generating of the signature error vector $e_s^T$, $e^T$ satisfying $He^T = s_i$ in which $e^T$ as the transposed matrix of vector e having a size of n has a size of n×1 is computed by performing complete decoding for the error detection based on the parity check matrix H with respect to the syndrome data $s_i$ of each variable i whenever while the variable i is randomly selected, the syndrome data $s_i$ is generated and then the variable i is selected at the time when the Hamming weight of $e^T$ is computed to be equal to or less than w which is the predetermined Hamming weight as a signature variable $i_s$ and $e^T$ computed to correspond to the signature variable $i_s$ is selected as the signature error vector $e_s^T$, and in the transmitting of the electronic signature value $Q^{-1}e_s^T$, the plain text message m, and the electronic signature value $Q^{-1}e_s^T$ and the signature variable $i_s$ are transmitted to the data receiving device.

11. The operating method of claim 10, wherein the data receiving device stores, in the memory, $K_{pub}$, in which $K_{pub} = SHQ$, having a size of (n−k)×n, which is a matrix multiplied by the invertible matrix S, the parity check matrix H, and the permutation matrix Q as a public key for verifying the electronic signature, and when the data receiving device receives the plain text message m, and the electronic signature value $Q^{-1}e_s^T$ and the signature variable $i_s$, the data receiving device checks whether the Hamming weight of the electronic signature value $Q^{-1}e_s^T$ is equal to or less than w which is the predetermined Hamming weight and then when it is verified that the Hamming weight of the electronic signature value $Q^{-1}e_s^T$ is equal to or less than w which is the predetermined Hamming weight, the data receiving device verifies the electronic signature value $Q^{-1}e_s^T$ based on the public key $K_{pub}$ and the signature variable $i_s$.

12. The operating method of claim 11, wherein the data receiving device additionally stores the hash function h(x) in the memory and when the plain text message m, and the electronic signature value $Q^{-1}e_s^T$ and the signature variable $i_s$ are received, the data receiving device verifies whether the Hamming weight of the electronic signature value $Q^{-1}e_s^T$ is equal to or less than w which is the predetermined Hamming weight and then when it is verified that the Hamming weight of the electronic signature value $Q^{-1}e_s^T$ is equal to or less than w which is the predetermined Hamming weight, the data receiving device computes the first hash value h(m) by applying the plain text message m to the hash function h(x) stored in the memory as the input, when the first hash value h(m) is computed, computes $h(h(m)|i_s$ which is a verification hash value by applying a result value $h(m)|i_s$ acquired by concatenating the bit value for the signature variable $i_s$ to the first hash value h(m) to the hash function h(x) as the input, and compares whether $K_{pub}Q^{-1}e_s^T$ which is a result value acquired by multiplying the public key $K_{pub}$ by the electronic signature value $Q^{-1}e_s^T$ coincides with $h(h(m)|i_s)^T$ which is the transposed matrix of the verification hash value $h(h(m)|i_s)$ and when it is determined that the $K_{pub}Q^{-1}e_s^T$ coincides with $h(h(m)|i_s)^T$ which is the transposed matrix of the verification hash value $h(h(m)|i_s)$, determines that verifying the electronic signature value $Q^{-1}e_s^T$ is successful.

13. A non-transitory computer readable recording medium having a program recorded therein for allowing a computer to execute an operating method of an electronic device capable of data communication through electronic signatures based on syndrome, the operating method comprising:

maintaining a private key storing unit storing a parity check matrix H for a linear code having a size of (n−k)×n, in which n and k are natural numbers and n is larger than k, configured by a Reed-Muller (RM) code, an invertible matrix S having a size of (n−k)×(n−k) including code values of '1' and '0' as components, and a permutation matrix Q having a size of n×n including the code values of '1' and '0' as the components as a private key for the electronic signature;

generating syndrome data $s_i$ to be used as the syndrome based on the plain text message m to be transmitted to a data receiving device and the invertible matrix S;

generating a signature error vector $e_s^T$ by performing the syndrome decoding for error detection with respect to the syndrome data $s_i$ based on the parity check matrix H;

computing $Q^{-1}e_s^T$ by multiplying a left term of the signature error vector $e_s^T$ by $Q^{-1}$ which is an inverse matrix of the permutation matrix Q to generate the computed $Q^{-1}e_s^T$ as the electronic signature value for the plain text message m; and transmitting the plain text message m and the electronic signature value $Q^{-1}e_s^T$ to the data receiving device.

* * * * *